United States Patent

Le Bellec

[15] 3,666,891

[45] May 30, 1972

[54] TRANSLATOR UNIT FOR TELEPHONE EXCHANGE

[72] Inventor: Christian H. Le Bellec, 21, rue Joseph Morand, Lannion, France

[22] Filed: June 29, 1970

[21] Appl. No.: 50,804

[30] Foreign Application Priority Data

June 30, 1969 France ..................................6922060

[52] U.S. Cl. ......................................179/18 ET, 179/15 AT
[51] Int. Cl. ...........................................................H04q 3/47
[58] Field of Search ..............................................179/18 ET

[56] References Cited

UNITED STATES PATENTS

| | | | |
|---|---|---|---|
| 3,527,896 | 9/1970 | Hills et al. | 179/18 ET |
| 3,536,846 | 10/1970 | Reines et al | 179/18 ET |

*Primary Examiner*—William C. Cooper
*Attorney*—Abraham A. Saffitz

[57] ABSTRACT

Translator of directory numbers for telephone switching network. The directory number is divided into a first part and second part which are stored in two registers. The translator essentially comprises an analysis store and a plurality of translation stores which are circulating stores all synchronous with one another. The analysis store has written therein all the values assumable by the first part number and the second part number and, associated with each of said values, the address of a given translation store. Two comparisons are made, the first between the first part of the directory number to be translated and its assumable values which results in the selection of the translation store having as its address the address associated with said first part. The second comparison is between the second part of the directory number to be translated and its assumable values which results in a read-out signal applied to the selected translation store.

2 Claims, 2 Drawing Figures

INVENTOR
CHRISTIAN H. LE BELLEC

BY Abraham A. Saffitz
ATTORNEY

INVENTOR
CHRISTIAN H. LE RELLE[illegible]

BY Abraham A. Saffitz
ATTORNEY

TRANSLATOR UNIT FOR TELEPHONE EXCHANGE

The present invention relates to a translator unit for a telephone exchange.

During a telephone call, the calling subscriber dials the directory number of the called subscriber. This directory number is different from the number which, in a spaced-division switching network, defines the equipment of the called subscriber's line in a plurality of equipments of subscriber's lines or the number which, in a time-division switching network, defines a modem concerned in a plurality of modems and the called subscriber's line at the input of said modem; now, it is these later data which are necessary to enable the control circuits of the switching network to establish the desired connection. In a symmetrical manner, a calling subscriber is identified in the switching network by data defining the geometric position of his line equipment, and the control circuits of the exchange need to his directory number, in order to charge the call. The apparatus which effects the correspondence of the directory numbers with the geometric data of the subscriber's equipment, and also with supplementary data such as subscribers' service discrimination is usually called a translator unit.

In some telephone systems, a translator is associated with each register. In other telephone systems, a translator is associated with several registers.

The translator of the present invention is a circuit with a high efficiency, common to all the registers forming the multiregister of an electronic switching network, and with a very rapid action.

The prior art translators generally comprise a register for receiving the directory number to be translated, at least a circulating store in which there is written a table of correspondence between all the values assumable by this directory number and the corresponding translated numbers, and a comparator which compares the directory number in the register with its successive possible values written in the circulating store. The translated number is the number written in the store beside the directory number in the correspondence table when coincidence occurs.

The directory number is generally divided into two parts and these parts are successively and separately translated. However, these two translations cannot remain uncorrelated since the translation of the second part of the directory number is not one and the same number whatever the first part may be. In order that these two translations become uncorrelated, it is necessary to connect the subscriber's line having a given directory number to a line equipment having the same number in all of the exchanges, but this is quite impractical. Consequently, in the prior art, the translator stage translating the first part of the directory number directs the second part to a particular translator of the translator stage translating this second part. Further, two translated numbers are to be read out from two comparators and the time during which the translator unit is engaged in a complete translation comprises two read-out times and a switching time.

The object of the invention is to provide a translator unit usable in a switching network of large capacity and having a very short operation time.

The directory numbers being divided into two parts, the translator of the invention comprises two input registers each receiving a part of a complete directory number, a first circulating analysis store in which there is written a table of correspondence between all the values assumable by the first and second part of the directory numbers and respective addresses associated with said values, a plurality of translation stores having as addresses the addresses written in the analysis store, synchronous with said analysis store and each containing the translated numbers corresponding to a group of directory numbers all having the same first part, means for comparing the first part of the directory number to be translated to all the values assumable by said first part, means for selecting that of said translation stores having as its address the address associated with the value of said first part in said analysis store, means for comparing the second part of the directory number to be translated to all the values assumable by said second part, and means for applying to the selected translation store a read-out signal at the very moment when said second part comparing means detects a positive comparison.

The invention will now be described in detail in relation to the accompanying drawings in which.

Figure 1:
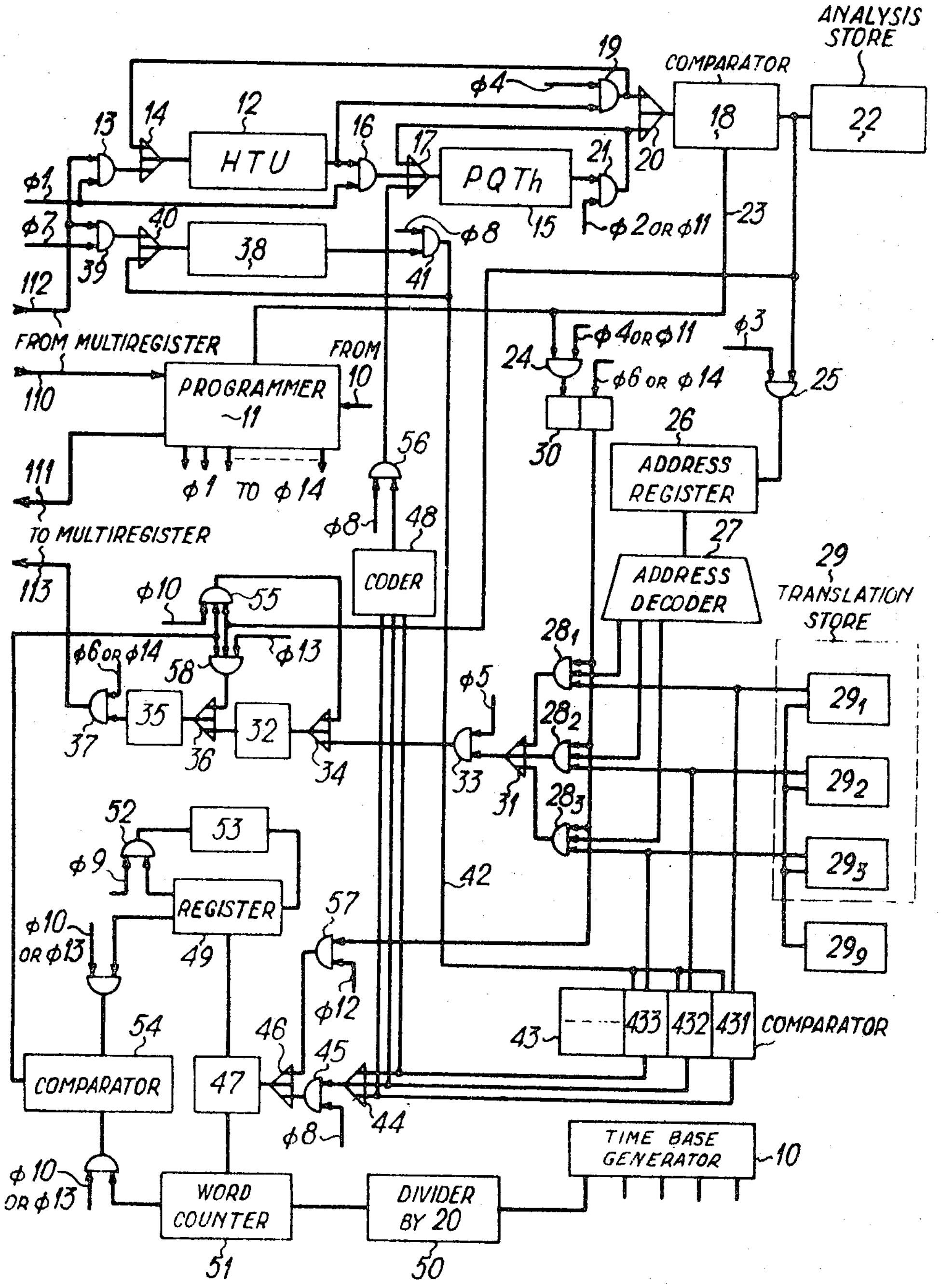
FIG. 1 is a block diagram of the translator of the invention.

Referring to FIG. 1, the translator acts under the general control of a time base generator 10 which produces timing pulses which are applied to the different circuits of the translator and of a programmer or phase distributor 11. Programmers are well known in the art and serve to send control signals during a given phase to logic circuits such as AND gates when certain conditions are fulfilled. These conditions may be the end of the preceding phase or the occurrence of a given event in the course of the preceding phase. As it will be seen in the following, certain phases ($O_{1,3}$) have a predetermined duration and others ($0_2$, $O_4$) a variable duration. The programmer 11 is controlled by the time base generator 10. It is initiated by a pulse coming from the multiregister of the switching network through lead 110 on each request for translation or inverse translation and it transmits a pulse to the multiregister through lead 111 when it has terminated its program.

The direct translation phases are the phases $0_1$ to $0_8$ and the inverse translation phases $0_7$ to $0_{14}$.

The time base generator 10 sends timing pulses to a word counter 51 through the intermediary of a frequency divider 50. The words recorded in the translation store being assumed to have 20 binary digits, the circuit 50 is a divider by 20.

The multiregister is connected by lead 112 to two cascade connected directory number stores 12 and 15. It is connected to the directory number store 12 through AND gate 13 and OR gate 14. The store 12 is a shift register designed to receive from the multiregister figures in hundreds H, tens T and units U of the numbers of called subscribers, in the binary coded decimal form. The store 12 comprises twelve flipflops. It is connected to a second store of directory numbers 15 through AND gate 16 and OR gate 17. The store 15 is also a shift register designed to receive from the multiregister the indicative figures P, Q defining the number of the terminating exchange and the thousands figure Th of the numbers of the called subscribers. The store 15 also has twelve flipflops.

The stores 12 and 15 are connected to a comparator 18, the first through AND gate 19 and OR gate 20 and the second through AND gate 21 and this same OR gate 20.

The filling of the stores 12 and 15 takes place during phase $O_1$ in the course of which gates 13 and 16 are open. In the course of phase $O_2$, the gate 21 is open and the store 15 is looped onto itself and operates as a circulating store, transferring cyclically its contents into the comparator 18. In the course of phase $O_4$, it is gate 19 which is open and, in a similar fashion, the store 12 is looped on itself and acts as a circulating store, transferring cyclically its contents into comparator 18.

The comparator 18 is a circuit with two inputs through which it receives two data X and Y and an output through which it supplies the dilemma function $X\overline{Y}+\overline{X}Y$. The data X is supplied, either by the store 15, or by the store 12; in the first case, the data is the number PQTh and in the second case, it is the number HTU. The data *Y* is supplied by the analysis store 22 which is a circulating magnetostriction store. The analysis store 22 contains a table of numbers expressed in binary coded decimal form which are binary translations of numbers comprising three decimal digits from 111 to 000 (a zero composed with a dial is represented by 10). Aside each number there is written an address of eight binary digits designating that of the translation store fractions $29_1$, $29_2$, $29_3$, . . . in which the translation of the six digit number PQTh–HTU is located. Each word of the analysis store 22 thus has 20 binary digits of which 12 only serve for comparison, the eight other forming an address.

When, during the first comparison, the output signal of the comparator 18 is one, that is to say when $X=Y$, first the comparator 18 sends to the programmer 11, over lead 23, a signal which causes this programmer to pass to phase $0_3$, and in the course of this phase, the gate 25 is open and the address associated with the datum $Y$ is recorded in the address register 26. This address register 26 is associated with an address decoder 27 whose outputs are connected respectively to AND gates $\mathbf{28}_1$, $\mathbf{28}_2$, $\mathbf{28}_3$, . . . , these gates being also connected to fractions $\mathbf{29}_1$, $\mathbf{29}_2$, $\mathbf{29}_3$, . . . of the translation store 29.

The phase $O_4$ is similar to phase $O_2$. The store 12 is looped across the gate 19 open during $O_4$ and its contents are applied to one of the inputs of comparator 18. When the second comparison has taken place and if it is positive, the comparator 18 sends a signal to the programmer 11 through the lead 23 and to the flipflop 30 across gate 24: this signal causes flipflop 30 to change its state and this flipflop applies a signal in parallel to gates $\mathbf{28}_1$, $\mathbf{28}_2$, $\mathbf{28}_3$, . . . The gate whose opening had been prepared during phase $O_3$ by the address decoder 27 opens and it will be seen that this opening occurs at the very instant where the translation of the number PQTh–HTU appears at the output of the translation store fraction which has been selected during the first comparison.

In order to fix one's ideas, let us assume that the group PQ has three possible values, say 24, 25, 26 and that the exchange therefore comprises 30,000 subscriber's lines. The analysis store 22 as, as pointed out above, comprises one thousand numbers for dealing with the translation of HTU but only three tens out of these 1,000 numbers are used for dealing with the translation of PQTh, namely 241 to 240, 251 to 250 and 261 to 260. Therefore the translation store fractions are 30 in number. This can be achieved by taking a translation store unit formed by eight circulating stores $\mathbf{29}_1$ to $\mathbf{29}_8$, each one having four reading heads. The addresses associated with the 1,000 numbers of analysis store 22 have been assumed to comprise eight bits; only five bits are necessary to select the circulating store (one out-of eight) and the reading head in the selected circulating store (one out-of four); the three supplemental bits are intended for service discrimination purpose and are useless in the present invention.

The eight circulating stores $\mathbf{29}_1$ to $\mathbf{29}_8$ and the analysis circulating store are synchronous stores. This means that at the very time where there appear at the output of store 22 the numbers 111, 112, . . . 009, 000, there simultaneously appear :

at the first outpue of $\mathbf{29}_1$, the translations of the numbers :
241 111, 241 112, . . . 241 009, 241 000
at the second output of $\mathbf{29}_1$, the translations of the numbers :
242 111, 242 112, . . . 242 009, 242 000, etc.
at the first output of $\mathbf{29}_8$, the translations of the numbers :
269 111, 269 112, . . . 269 009, 269 000
at the second output of $\mathbf{29}_8$, the translations of the numbers :
260 111, 260 112, . . . 260 009, 260 000 The third and fourth outputs of $\mathbf{29}_8$ being unused.

If the number to translate is
251 156 the comparison of 251 results in the address 01111 in which the three first bits designate store $\mathbf{29}_3$ and the two last bits designate the third reading head. The comparison of 156 results in a signal from flipflop 30 which opens gate $\mathbf{28}_3$ at the very time where the translation of 251 156 appears at the output of the said third reading head.

The binary digits of the translated number are transferred into the shift registers 32 and 35 through OR gate 31, AND gate 33 open in $0_5$ and the OR gates 34 and 36. During phase $0_6$, the AND gate 37 is open and the translated number is transferred in the multiregister through line 113; simultaneously flipflop 30 is reset.

When phase $0_6$ is terminated, the phase distributor 11 sends over lead 111 a signal to the multiregister. In the case when a comparison has not been able to be done (no binary digit transmitted by lead 113), the multiregister transmits to the calling subscriber the engaged signal.

If, now, it is a matter of translating the number of the calling subscriber, the programmer 11 received over lead 110 a request for inverse translation and, instead of distributing phases $0_1$ to $0_8$, it distributes phases $0_7$ to $0_{14}$.

In phase $0_7$, the number in binary code of the calling subscriber's equipment is transmitted by the multiregister to the translator over line 112 and is received in shift register 38 through the AND gate 39 open in phase $0_7$, and the OR gate 40. In phase $0_8$, the AND gate 41 is open, the register 38 is looped and functions as a circulating store and its contents are applied over lead 42 to one of the inputs of comparison group 43 which contains as many comparators 431, 432, 433, . . . as the memory 29 contains fractions $\mathbf{29}_1$, $\mathbf{29}_2$, $\mathbf{29}_3$, . . . The comparators 431, 432, 433, . . . are each similar to comparator 18. The contents of the stores $\mathbf{29}_1$, $\mathbf{29}_2$, $\mathbf{29}_3$, . . . are thus compared with a circulating content in the looped register 38. When the compared data are identical, the comparator which has detected the identity transmits a timing signal which, through the OR gate 44, the AND gate 45 open in $0_8$ , and the OR gate 46, is applied to the group of AND gates 47. The instant when this signal occurs is, which is significant of the number HTU, then allowed to be fixed and from this instant, the number HTU can be derived, as will be explained. On the other hand, this same signal is applied to the coder 48 which codes in binary code the address of the comparator from which this signal is issued. As this address is the same as the translation store fraction address, which is significant of the number PQTh, this number PQTh can be derived therefrom.

The group of AND gates 47 is composed of transfer gates between the flipflop of the word counter 51 and the flipflop of a register 49. When the gates 45 are open, the number of the word contained in 51 is transferred into the register 49, playing the part of a time reference. However, in the operation of the translation store, the time-address of the number HTU, which is precisely the number of the time-word in counter 51 when flipflop 30 triggers, antecedes by one time-word the time-address of the translated number since the opening of the gates $\mathbf{28}_1$, $\mathbf{28}_2$, $\mathbf{28}_3$ only begins at the triggering of 30. It results that the time-address of the translated word follows by one time-word the time-address of word HTU. Therefore, for deriving the time-address of (HTU) not translated from the time-address of (HTU) translated, a unit must be substracted from the latter.

During phase $0_9$, register 49 is looped across AND gate 52, and the information contained in register 49 is put into circulation in the loop thus formed. This loop comprises a unit substracter 53. After one turn, the timing word contained in register 49 is the time-address of (HTU) not translated.

During phase $0_{10}$, the number of the time-word in register 49 is compared sequentially to the successive time-words in counter 51 by means of comparator 54. When the coincidence occurs, the original number HTU is transferred from analysis store 22 to register 32 through AND gate 55 controlled by comparator 54 and open in $0_{10}$.

It remains to seek the number PQTh from the number of that of the comparators 431, 432, 433, . . . which has served to obtain the coded signal in 48. In phase $0_8$, the word in 48, which is the address of a translation store fraction, is transferred into the store 15 through AND gate 56 open in $0_8$ and OR gate 17. In phase $0_{11}$, the AND gate 21 is open, the store 15 is looped and put into circulation and the comparator 18 compares the address in question with the addresses associated with the words of three decimal figures. In coincidence, the flipflop 30 changes its state. In phase $0_{12}$, AND gate 57 is open for the signal coming from flipflop 30 and this opens gates 47; the time-word in 51 is again transferred into register 49 but, this time, there is no longer substraction of a unit by the substracter 53, in view of the fact that the information PQTh sought is contemporary with the address of the comparator 431, 432, 433, . . . used.

In phase $0_{13}$, the time-word in 49 is compared with the successive time-words in the counter 51, in the comparator 54. When the parallel coincidence takes place, the gate 58 passing in phase $0_{13}$ allows the number delivered by the analysis store 22 to pass. This is the number PQTh sought which is arranged in register 35 through OR gate 36.

In phase $0_{14}$, the content of registers 32 and 35 is transferred into the multiregister across the AND gate 37 open in $0_{14}$ and the line 113.

The circulation magnetostriction stores $29_1$, $29_2$, $29_3$, . . . operate at a bit frequency of 1.28 MHz.

Figure 2:
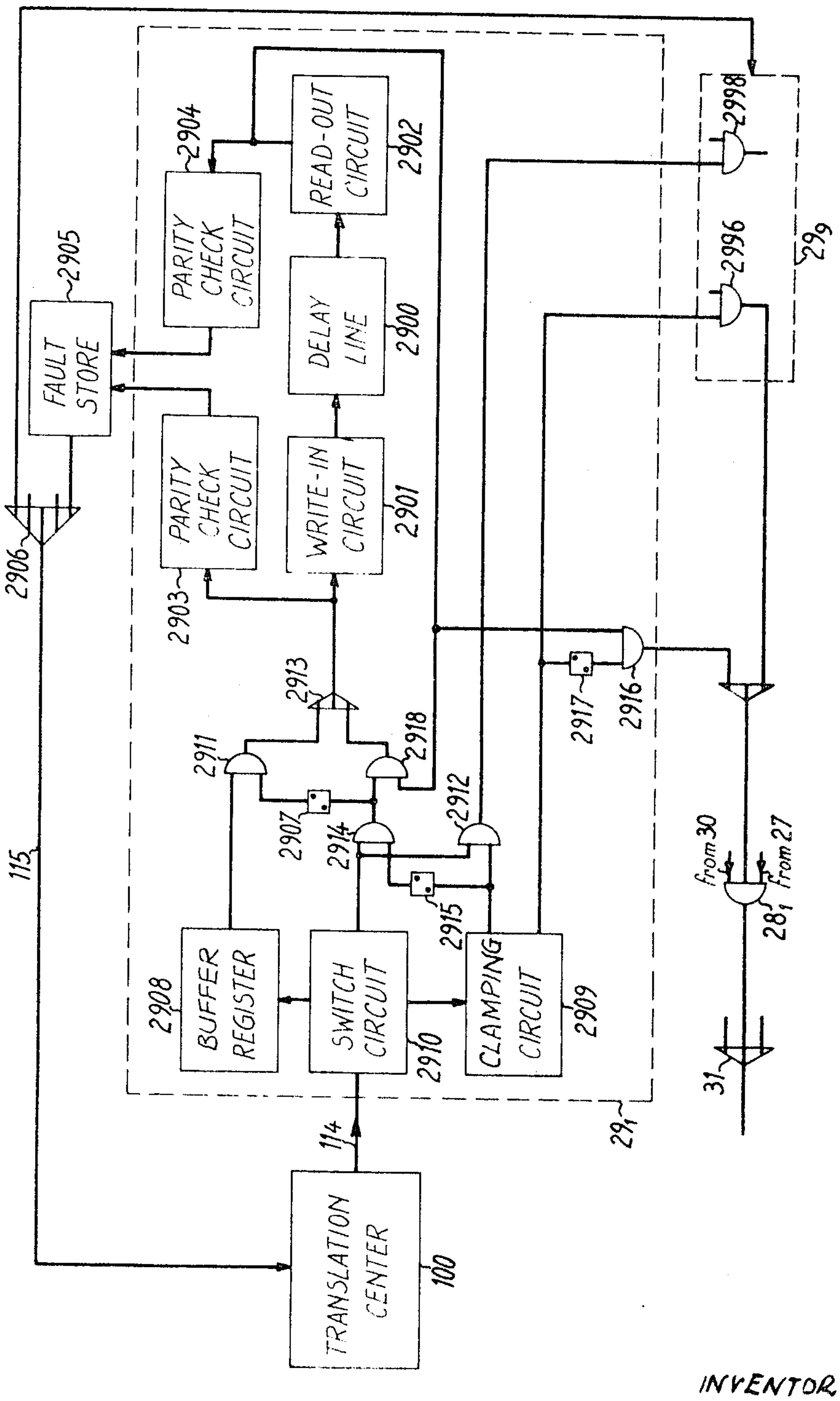
FIG. 2 represents in detail one of the fractional stores of the translator.

FIG. 2 represents one of the fractional stores $29_n$ of the translation store and how this fractional store can be written-in, surveyed and replaced when it is out of action, from a translation center 100.

The translation center 100 is linked to the translation store $29_1$ by two lines 114 and 115, the first for transmission and the second for reception. The line 114 ends in a switching circuit 2,910 which, according to the signal which it receives, connects line 114 to a buffer register 2,908 or to a clamping circuit 2,909. The buffer register 2,908 serves to supply data to write-in circuit 2901 in order to write the same in delay line 2,900. The clamping circuit 2909 is a circuit designed to substitute a fractional store $29_9$ for a fractional store $29_1$ which is out of action.

The clamping circuit 2909, when it receives a signal of a first polarity, positive for example, opens AND gate 2914 and 2916 across the inverters 2915 and 2917 (this corresponds to the case in which the fractional store $29_1$ functions well) and, when it receives a signal of a second polarity, negative for example, opens the gates 2912 and 2996 (this corresponds to the case where the fractional store $29_1$, being out of action, is to be replaced by the fractional store $29_9$). The gate 2916 controls the output from store $29_1$ towards gate $28_1$ while the gate 2996 controls the output from store $29_9$ towards this same gate $28_1$. The gate 2914 controls the gate 2918 which is the gate controlling the looping of the delay line 2900. Similarly, the gate 2912 controls the gate 2998 situated in the interior of the fractional store $29_9$ and controlling the looping of this store.

For the write-in of store $29_1$, the switching circuit 2910 closes AND gate 2914 and opens AND gate 2911 through inverter 2907. AND gate 2918 is closed and the store is unlooped. The data to be written into store $29_1$ are applied thereto across AND gate 2911, OR gate 2913 and the write-in circuit 2901 associated with the parity check circuit 2903.

The read-out circuit 2,902 is also associated with a parity check circuit 2904 and the parity circuits 2903 and 2904 are connected to a fault memory 2905. This fault memory is linked to the translation center 100 across an OR gate 2906.

What we claim is:

1. Translator unit for a telephone exchange comprising two input registers for storing complete directory numbers each divided into a first part and a second part, each of said input registers storing one of said parts, a circulating analysis store in which there is written a table of correspondence between all the values assumable by said first and second parts of the directory number and respective addresses associated with said values, a plurality of circulating translation stores having as addresses the addresses written in the analysis store, said circulating translation stores being synchronous with said circulating analysis store and each containing the translated numbers corresponding to a group of complete directory numbers having the same first part, first means for comparing the first part of the directory number to be translated to all the values assumable by said directory number first part, means for selecting that of said translation stores having as its address the address associated with the value of said first part in said analysis store, second means for comparing the second part of the directory number to be translated to all the values assumable by said directory number second part, and means, controlled by said second comparing means, for applying to the selected translation store a read-out signal when said second comparing means detects a positive comparison.

2. Translator unit for a telephone exchange as set forth in claim 1 further comprising a third register for storing an already translated number to be translated back onto a complete directory number, a plurality of comparators respectively associated with said translation stores for comparing said already translated number to all the values assumable by said translated number and contained in said translation stores, means for detecting the address of the comparator having detected a positive comparison and the instant at which said positive comparison has occured, means for determining the directory number first part associated with said address in the circulating analysis store and means for determining the directory number second part which appears at the output of said analysis store at said instant.

* * * * *